(12) United States Patent
Pickett

(10) Patent No.: US 6,175,908 B1
(45) Date of Patent: *Jan. 16, 2001

(54) VARIABLE BYTE-LENGTH INSTRUCTIONS USING STATE OF FUNCTION BIT OF SECOND BYTE OF PLURALITY OF INSTRUCTIONS BYTES AS INDICATIVE OF WHETHER FIRST BYTE IS A PREFIX BYTE

(75) Inventor: James K. Pickett, Austin, TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/070,392

(22) Filed: Apr. 30, 1998

(51) Int. Cl.[7] ..................... G06F 9/312
(52) U.S. Cl. .............. 712/204; 712/206; 712/207; 712/213
(58) Field of Search .................. 712/204, 213, 712/206, 207, 217, 218, 23

(56) References Cited

U.S. PATENT DOCUMENTS

| 3,585,605 | 6/1971 | Gardner | 712/214 |
| 4,044,338 | 8/1977 | Wolf | 365/49 |
| 4,453,212 | 6/1984 | Gaither et al. | 711/2 |

(List continued on next page.)

FOREIGN PATENT DOCUMENTS

| 0259095 | 3/1988 | (EP) . |
| 0381471 | 8/1990 | (EP) . |
| 0459232 | 12/1991 | (EP) . |
| 0 651 322 A1 | 5/1995 | (EP) . |
| 0 651 324 | 5/1995 | (EP) . |
| 0 718 758 | 6/1996 | (EP) . |
| 2263985 | 8/1993 | (GB) . |
| 2263987 | 8/1993 | (GB) . |
| 2281422 | 3/1995 | (GB) . |

(List continued on next page.)

OTHER PUBLICATIONS

Intel, "Chapter 2: Microprocessor Architecture Overview," 1994, pp. 2–1 through 2–4.

Michael Slater, "AMD's K5 Designed to Outrun Pentium," Microprocessor Report, vol. 8, No. 14, Oct. 24, 1994, 7 pages.

(List continued on next page.)

* cited by examiner

Primary Examiner—Meng-Ai T. An
Assistant Examiner—Gautam R. Patel
(74) Attorney, Agent, or Firm—Conley, Rose, & Tayoun, PC; Lawrence J. Merkel

(57) ABSTRACT

A superscalar microprocesor is provided that includes a predecode unit adapted for predecoding variable byte-length instructions. The predecode unit predecodes the instructions prior to their storage within an instruction cache. In one system, a predecode unit is configured to generate a plurality of predecode bits including a start bit, an end bit, and a functional bit for each instruction byte. The plurality of predecode bits associated with each instruction byte are collectively referred to as a predecode tag. An instruction alignment unit then uses the predecode tags to dispatch the variable byte-length instructions to a plurality of decode units within the superscalar microprocessor. The predecode unit is configured such that the meaning of the functional bit of a particular predecode tag is dependent upon the status of the start bit. The predecode unit is further configured to generate a functional bit associated with each byte of an instruction other than the starting byte, which indicate whether the associated byte is a prefix or opcode. The encoding of the predecode tags is such that a relatively large amount of predecode information may be conveyed with a relatively small number of predecode bits.

38 Claims, 7 Drawing Sheets

U.S. PATENT DOCUMENTS

| | | | |
|---|---|---|---|
| 4,807,115 | 2/1989 | Torng | 712/215 |
| 4,858,105 | 8/1989 | Kuriyama et al. | 712/235 |
| 4,928,223 | 5/1990 | Dao et al. | 712/247 |
| 5,053,631 | 10/1991 | Perlman et al. | 708/508 |
| 5,058,048 | 10/1991 | Gupta et al. | 708/508 |
| 5,129,067 | 7/1992 | Johnson | 708/508 |
| 5,136,697 | 8/1992 | Johnson | 712/239 |
| 5,179,674 | 1/1993 | Williams et al. | 711/204 |
| 5,226,126 | 7/1993 | McFarland et al. | 712/218 |
| 5,226,130 | 7/1993 | Favor et al. | 712/238 |
| 5,337,415 | 8/1994 | DeLano et al. | 712/204 |
| 5,357,618 | 10/1994 | Mirza et al. | 711/3 |
| 5,438,668 | 8/1995 | Coon et al. | 712/204 |
| 5,442,760 | 8/1995 | Rustad et al. | 712/215 |
| 5,459,844 | 10/1995 | Eickemeyer et al. | 712/23 |
| 5,488,710 | 1/1996 | Sato et al. | 711/125 |
| 5,499,204 | 3/1996 | Barrera et al. | 365/40 |
| 5,513,330 | 4/1996 | Stiles | 712/204 |
| 5,530,825 | 6/1996 | Black et al. | 711/213 |
| 5,535,347 | 7/1996 | Grochowski | 712/204 |
| 5,537,629 | 7/1996 | Brown et al. | 712/210 |
| 5,544,342 | 8/1996 | Dean | 711/119 |
| 5,551,010 | 8/1996 | Iino et al. | 712/238 |
| 5,559,975 | 9/1996 | Christie et al. | 712/230 |
| 5,560,028 | 9/1996 | Sachs et al. | 712/23 |
| 5,566,298 | 10/1996 | Boggs et al. | 714/10 |
| 5,586,276 | 12/1996 | Grochowski et al. | 712/204 |
| 5,598,544 | 1/1997 | Ohshima | 712/204 |
| 5,600,806 | 2/1997 | Brown et al. | 712/204 |
| 5,625,787 | 4/1997 | Mahin et al. | 712/204 |
| 5,644,744 | 7/1997 | Mahin et al. | 712/207 |
| 5,644,748 | 7/1997 | Utsunomiya et al. | 711/207 |
| 5,651,125 | 7/1997 | Witt et al. | 712/218 |
| 5,689,672 | 11/1997 | Witt et al. | 212/213 |
| 5,729,707 | 3/1998 | Maki | 712/207 |
| 5,742,791 | 4/1998 | Mahalingaiah et al. | 711/146 |
| 5,751,981 | 5/1998 | Witt et al. | 712/204 |
| 5,758,114 | 5/1998 | Johnson et al. | 712/204 |
| 5,758,116 | 5/1998 | Lee et al. | 712/210 |
| 5,819,059 | 10/1998 | Tran | 712/213 |
| 5,826,053 * | 10/1998 | Witt | 712/210 |
| 5,872,943 * | 2/1999 | Pickett et al. | 712/204 |
| 5,898,851 | 4/1999 | Narayan et al. | 712/210 |
| 5,935,238 | 8/1999 | Talcott et al. | 712/206 |
| 5,940,602 | 8/1999 | Nayayan et al. | 712/213 |
| 5,968,163 | 10/1999 | Narayan et al. | 712/204 |
| 5,970,235 * | 10/1999 | Witt et al. | 712/213 |
| 5,987,235 * | 11/1999 | Tran | 712/210 |

OTHER PUBLICATIONS

Sebastian Rupley and John Clyman, "P6: The Next Step?, " PC Magazine, Sep. 12, 1995, 16 pages.

Tom R. Halfhill, "AMD K6 Takes On Intel P6," BYTE, Jan. 1996, 4 pages.

"*Intel Architecture Software Developer's Manual, vol. 1: Basic Architecture*", Intel Corporation, Prospect IL, 1996, 1997, Chapter 8: Programming With The Intel MMX™ Technology, pp 8–1 through 8–15.

Holstad, S., "Tutorial Tuesday: Decoding MMX" Jan. 14, 1997, Earthlink Network, Inc. copyright 1997, 5 pages (see http://www.earthlink.net/daily/Tuesday/MMX).

"Intel MMX™ Technology—Frequently Asked Questions" 6 pages (see http://www.intel.com/drg/mmx/support/faq/htm).

XP 000212140 Pleszkun, et al, "Structure Memory Access Architecture," Department of Computer Science, University of Wisconsin, IEEE 1983, pp. 461–471.

XP 000411690 Hua, et al, "Designing High–Perfornace Processors Using Real Address Prediction," IEEE Transactions on Computers 42 (1993) Sep., No. 9, New York, U.S., pp. 1146–1151.

XP 000337480 Baer, "An Effective On–Chip Preloading Scheme To Reduce Data Access Penalty," Department of Computer Science and Engineering, University of Washington, Seattle, WA, ACM, 1991, pp. 176–186.

Minagawa, et al, "Pre–Decoding Mechanism For Superscalar Architecture," IEEE Pacific Rim Conference on Communication, Computers and Signal Processing, May 9–10, 1991, pp. 21–24.

Tomasulo, "An Efficient Algorithm for Exploiting Multiple Arithmetic Units," IBM Journal 1967, pp. 25–33.

| Valid 112 | Start Ptr 114 | End Ptr 116 | Valid Mask 118 | MROM/ Fast Path 120 | Branch Prediction 122 |
|---|---|---|---|---|---|

| Address Bits 132 | Functional Bits 134 | Segment Limit 136 | Overflow 138 | Instruction Bytes 140 |
|---|---|---|---|---|

VARIABLE BYTE-LENGTH INSTRUCTIONS USING STATE OF FUNCTION BIT OF SECOND BYTE OF PLURALITY OF INSTRUCTIONS BYTES AS INDICATIVE OF WHETHER FIRST BYTE IS A PREFIX BYTE

BACKGROUND OF THE INVENTION

1. Field of the Invention

This invention relates to superscalar microprocessors and, more particularly, to the predecoding of variable byte-length computer instructions within high performance and high frequency superscalar microprocessors.

2. Description of the Relevant Art

Superscalar microprocessors are capable of attaining performance characteristics which surpass those of conventional scalar processors by performing concurrent execution of multiple instructions. Due to the widespread acceptance of the x86 family of microprocessors, efforts have been undertaken by microprocessor manufacturers to develop superscalar microprocessors which execute x86 instructions. Such superscalar microprocessors achieve relatively high performance characteristics while advantageously maintaining backwards compatibility with a vast amount of existing software developed for previous microprocessor generations such as the 8086, 80286, 80386, and 80486.

The x86 instruction set is relatively complex and is characterized by a plurality of variable byte-length instructions. An x86 instruction consists of from one to five optional prefix bytes, followed by an operation code (opcode) field, an optional addressing mode (Mod R/M) byte, an optional scale-index-base (SIB) byte, an optional displacement field, and an optional immediate data field.

The opcode field defines the basic operation for a particular instruction. The default operation of a particular opcode may be modified by one or more prefix bytes. For example, a prefix byte may be used to change the address or operand size for an instruction, to override the default segment used in memory addressing, or to instruct the processor to repeat a string operation a number of times. The opcode field follows the prefix bytes, if any, and may be one or two bytes in length. It is understood that when the opcode field is two bytes, the first byte thereof is considered a prefix. The addressing mode (MODRM) byte specifies the registers used as well as memory addressing modes. The scale-index-base (SIB) byte is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is the optional displacement field, which may be from one to four bytes in length. The displacement field contains a constant used in address calculations. The optional immediate field, which may also be from one to four bytes in length, contains a constant used as an instruction operand. The 80286 sets a maximum length for an instruction at 10 bytes, while the 80386 and 80486 both allow instruction lengths of up to 15 bytes.

The complexity of the x86 instruction set poses difficulties in implementing high performance x86 compatible superscalar microprocessors. One difficulty arises from the fact that instructions must be aligned with respect to the parallel-coupled instruction decoders of such processors before proper decode can be effectuated. In contrast to most RISC instruction formats, since the x86 instruction set consists of variable byte-length instructions, the start bytes of successive instructions within a line are not necessarily equally spaced, and the number of instructions per line is not fixed. As a result, employment of simple, fixed-length shifting logic to align the instructions with the decoders cannot be achieved with x86 instructions.

Superscalar microprocessors have been proposed (but not published or otherwise made part of the prior art) that employ instruction predecoding techniques to help solve the problem of quickly aligning, decoding and executing a plurality of variable byte-length instructions in parallel. In one such superscalar microprocessor, when instructions are written within the instruction cache from an external main memory, a predecoder appends three predecode bits (e.g., a start bit, a functional bit and an end bit, referred to collectively as a predecode tag) to each byte. The start bit is set to one for the start byte of every instruction, and is zero otherwise. The end bit is set to one for the end byte of every instruction, and is zero otherwise. The functional bit is the predecode bit with a unique purpose. The functional bit associated with the end byte is set to zero for fast path instructions, and set to one for MROM instructions. The remaining functional bits from the start bit to the end bit (not including the end bit) are set according to whether the bytes are prefixes or not. In particular, all prefix bytes have their associated functional bit set to one and all non-prefix bytes have their functional bit set to zero for both fast path and MROM instructions.

As noted, the decode stage processes the prefix bytes to properly decode instructions. Predecoding instructions using the above identified proposed predecode tag encoding is advantageous in that the decode stage need not perform extra calculations to determine the location of the prefix bytes within an instruction since all the prefix bytes are identified with a set functional bit. Additionally, because the opcode byte follows the prefix bytes, if any, the decode stage need not perform extra calculations to identify the location of the opcode since the opcode is identified as the first byte with a cleared functional bit. Avoiding the extra step of identifying prefixes in an instruction reduces circuitry and delay within the decode stages. However, the above identified proposed predecode tag encoding presents a problem. Namely, it is impossible to determine whether an instruction is fast path or MROM until the end byte is scanned. This presents a problem for split line instructions in which the start byte of a particular is located in a first set of sixteen bytes while the end byte of the instruction is located in a subsequent set of sixteen bytes.

SUMMARY OF THE INVENTION

The problems outlined above are in large part solved by a superscalar microprocesor employing a predecode unit adapted for predecoding variable byte-length instructions in accordance with the present invention. In one embodiment, a predecode unit is provided which is capable of predecoding variable byte-length instructions prior to their storage within an instruction cache. The predecode unit is configured to generate a plurality of predecode bits for each instruction byte. The plurality of predecode bits associated with each instruction byte are collectively referred to as a predecode tag. An instruction alignment unit then uses the predecode tags to dispatch the variable byte-length instructions to a plurality of decode units within the superscalar microprocessor. Additionally, one or more instruction decode stages within the superscalar microprocessor use the predecode tags in decoding the instructions prior to their execution.

In one implementation, the predecode unit generates three predecode bits associated with each byte of instruction code: a "start" bit, an "end" bit, and a "functional" bit. The start bit is set if the associated byte is the first byte of the instruction. The start bit is cleared otherwise. Similarly, the end bit is set if the associated byte is the last byte of the instruction. The end bit is cleared otherwise. The encoding of the functional bit is dependent on the start byte of the instruction. If the instruction is a fast path instruction, the functional bit associated with the start byte is cleared. If the instruction is MROM, the functional bit associated with the start byte is set. For bytes of an instruction other than the start byte, the encoding of the functional bit is dependent on whether the associated byte is a prefix or opcode. Namely, the functional bit is set when the associated byte is a prefix or opcode, and the functional bit is cleared when the associated byte is not a prefix or opcode, thereby identifying the position of the prefix and opcode bytes. Since only functional bits associated with the prefix and opcode bytes are set, identifying the opcode byte position is made easier in that it is the byte associated with the last set functional bit.

The plurality of decode units to which the variable byte length instructions are aligned utilize the predecode tags to attain relatively fast decoding of the instructions. More particularly, with the information conveyed by the functional bits, the decode units know the exact location of the opcode and/or prefix bytes without having to first determine whether the instruction containing the opcode and/or prefix bytes is fast path or MROM. Additionally, since the prefix and/or opcode bytes (except for the prefix or opcode byte associated with the start byte) are uniformly identified by set functional bits, the logic needed within the decode units to identify the prefix and/or opcode byte positions, is simplified in that there is no need to invert functional bits associated with an MROM instruction in order to place the predecode tags in a condition which is recognizable by circuitry which identifies prefix and opcode bytes by set functional bits.

Broadly speaking, the present invention contemplates a superscalar microprocessor comprising an instruction cache for storing a plurality of variable byte-length instructions and a predecode unit coupled to the instruction cache and configured to generate a predecode tag associated with each byte of an instruction. The predecode tag includes a start bit having a value indicative of whether the byte is a starting byte of the instruction, an end bit having a value indicative of whether the byte is an end byte, and a functional bit whose meaning is dependent on the value of the start bit. The superscalar microprocessor further includes a plurality of decode units for decoding designated instructions which correspond to the plurality of variable byte-length instructions, and an instruction alignment unit coupled between the instruction cache and the plurality of decode units for providing decodable instructions to the plurality of decode units.

BRIEF DESCRIPTION OF THE DRAWINGS

Other objects and advantages of the invention will become apparent upon reading the following detailed description and upon reference to the accompanying drawings in which:

FIG. 5 is a diagram illustrating instruction identification information corresponding to one instruction within an instruction block according to one embodiment of the instruction alignment unit.

FIG. 6 is a diagram illustrating instruction identification information which is shared among the instructions within an instruction block according to one embodiment of the instruction alignment unit.

Figure 1:
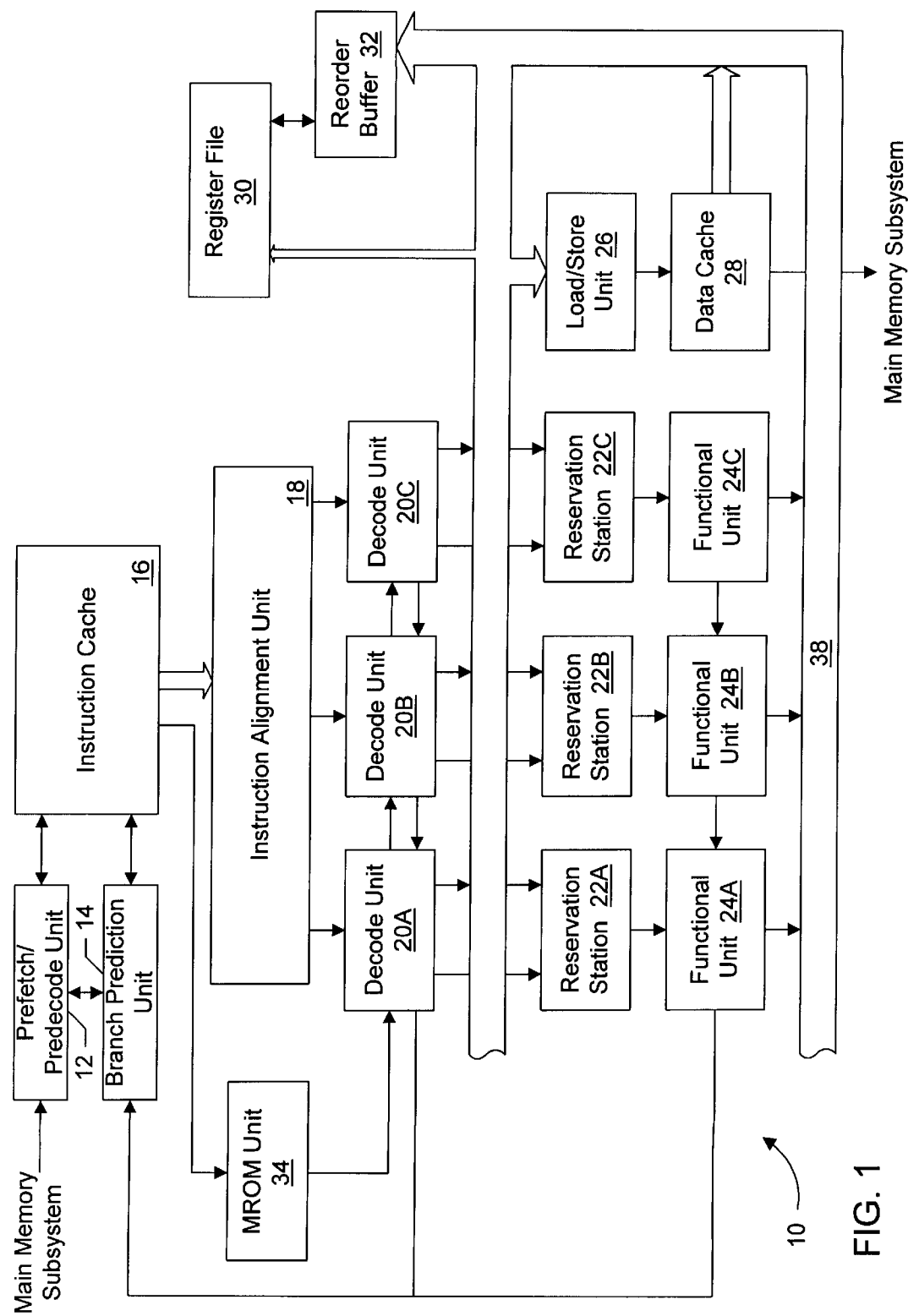
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, instruction alignment unit 18 is configured to receive instruction blocks from instruction cache 16 and to align instructions from the instruction blocks to decode units 20. Instruction alignment unit 18 employs a first byte queue for storing the instruction blocks. Instruction alignment unit 18 selects instructions from the first byte queue and stores them into a second byte queue. Based upon predetermined selection criteria, instruction alignment unit 18 selects one or more instructions from the second byte queue for conveyance to decode units 20. Advantageously, the relatively large number of instructions available in the instruction blocks is reduced to a smaller number of instructions via the first stage of selection from the first byte queue into the second byte queue. Because the second byte queue stores a smaller number of instructions, the selection criteria for selecting instructions for dispatch to the decode units 20 may be applied even in a high frequency implementation. Additionally, the selection criteria may be more complex, thereby allowing more instructions to be selected for concurrent dispatch than selection criteria applied to a larger number of instructions. Multiple instructions may thereby be identified for dispatch.

An instruction block, as used herein, comprises a fixed number of bytes within which up to a maximum number of instructions per block are identified. A particular instruction block may include fewer instructions than the maximum number of instructions per block within its fixed number of bytes. Alternatively, a given fixed number of bytes within instruction cache 16 may include more instructions than the maximum number of instructions per block. In the latter case, two or more instruction blocks are formed from the given fixed number of bytes. Each instruction block includes the fixed number of bytes but identifies different instructions within the fixed number of bytes as comprising the instruction block. The fixed number of bytes are aligned to a boundary of the fixed number of bytes. In one embodiment, instruction blocks comprise eight bytes aligned on an eight byte boundary and the maximum number of instructions per block is three. The maximum number of instructions per block is selected because the average length of an x86 instruction is three bytes. Therefore, each eight bytes of instruction code includes 2⅔ instructions on average. It is noted that the maximum number of instructions per block may be varied in various embodiments as a matter of design choice.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. The type of instruction may be determined by examining the functional bit corresponding to the start byte. If that functional bit is clear, the instruction is a fast path instruction. Conversely, if that functional bit is set the instruction is an MROM instruction. Regardless of whether the instruction is fast path or MROM, the functional bit associated with each prefix or opcode byte, other than the start byte, is set. The opcode of an instruction may thereby be located within either fast path or MROM instructions as the byte associated with the last set functional bit in the instruction. For example, a fast path instruction including two prefix bytes, an opcode byte, and two displacement bytes in sequence would have start, end, and functional bits as follows:

Start bits 10000
End bits 00001
Functional bits 01100

An MROM instruction including two prefix bytes, an opcode byte, and two displacement bytes in sequence would have start, end, and functional bits as follows:

Start bits 10000
End bits 00001
Functional bits 11100

MROM instructions are instructions which are determined to be too complex for decode by a single decode unit 20A–20C and for execution by a single functional unit 24A–24C. MROM instructions may be an example of microcode instructions. Generally, microcode instructions are instructions which are separated by a microcode unit (e.g. MROM unit 34) into two or more instructions, each of which may be decoded by a single decode unit 20A–20C and executed by a corresponding functional unit 24A–24C. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data (i.e., predecode tags consisting of start, end, and functional bits) is scanned to provide information to instruction alignment unit 18 (and to MROM unit 34) regarding the instructions being fetched. The predecode data is scanned to identify the type of instruction (i.e., fast path or MROM) in order to determine whether MROM unit 34 is to parse the instruction, and to determine the boundaries of the instructions for proper alignment. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
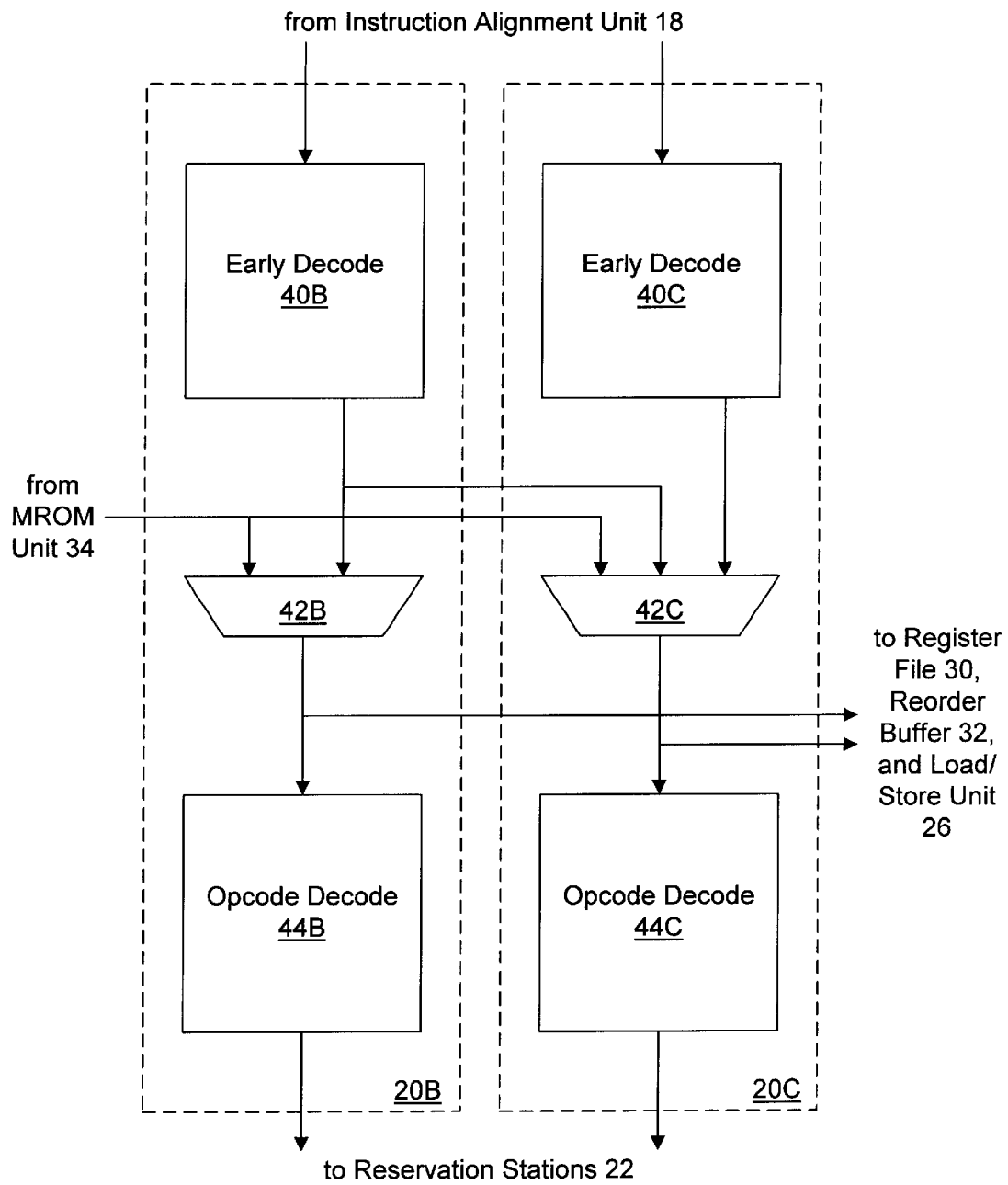
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

The functional bits of the predecode data, in one embodiment, are used by the early decode units 40 to identify prefixes prior to their merger into an encoded prefix. As noted above, the prefix and opcode bytes, other than the start byte, are designated by functional bits set to logical one. To identify whether a particular byte is a prefix, the decode unit logically ANDs the functional bit associated with a subsequent byte (i.e.,) with the logical inverse of the end bit of the particular byte in question (i.e., Prefix[I]=Func[i+1] &~End[i] where i represents the position of the particular byte in question). It is noted that ANDing the inverse of the end bit accounts for the case where the opcode of the instruction is the last byte. If the result of the logical ANDing operation yields a logical one, the particular byte in question is a prefix, and can be further processed as such. If the result of the logical ANDing operation yields a logical zero, the particular byte in question is not a prefix. Using this logical operation, the decode unit, or any other unit within processor 10, can easily identify each prefix in an instruction notwithstanding the fact that the functional bit associated with the start byte is used to identify the instruction as fast path or MROM. Prefixes, including those which are contained in an instruction split between two blocks, can be identified using the logical ANDing function. However, with respect to a split instruction, a split instruction bit is provided by the predecode unit and is used as the subsequent functional bit in the logical ANDing function to identify whether the last byte of the split instruction is a prefix. The split instruction bit becomes, in effect, the most significant bit of the functional bits in the predecode data. Additionally, since the opcode byte follows the prefix bytes, if any, the first logical zero produced by the logical ANDing function set forth above identifies the opcode position of the instruction.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
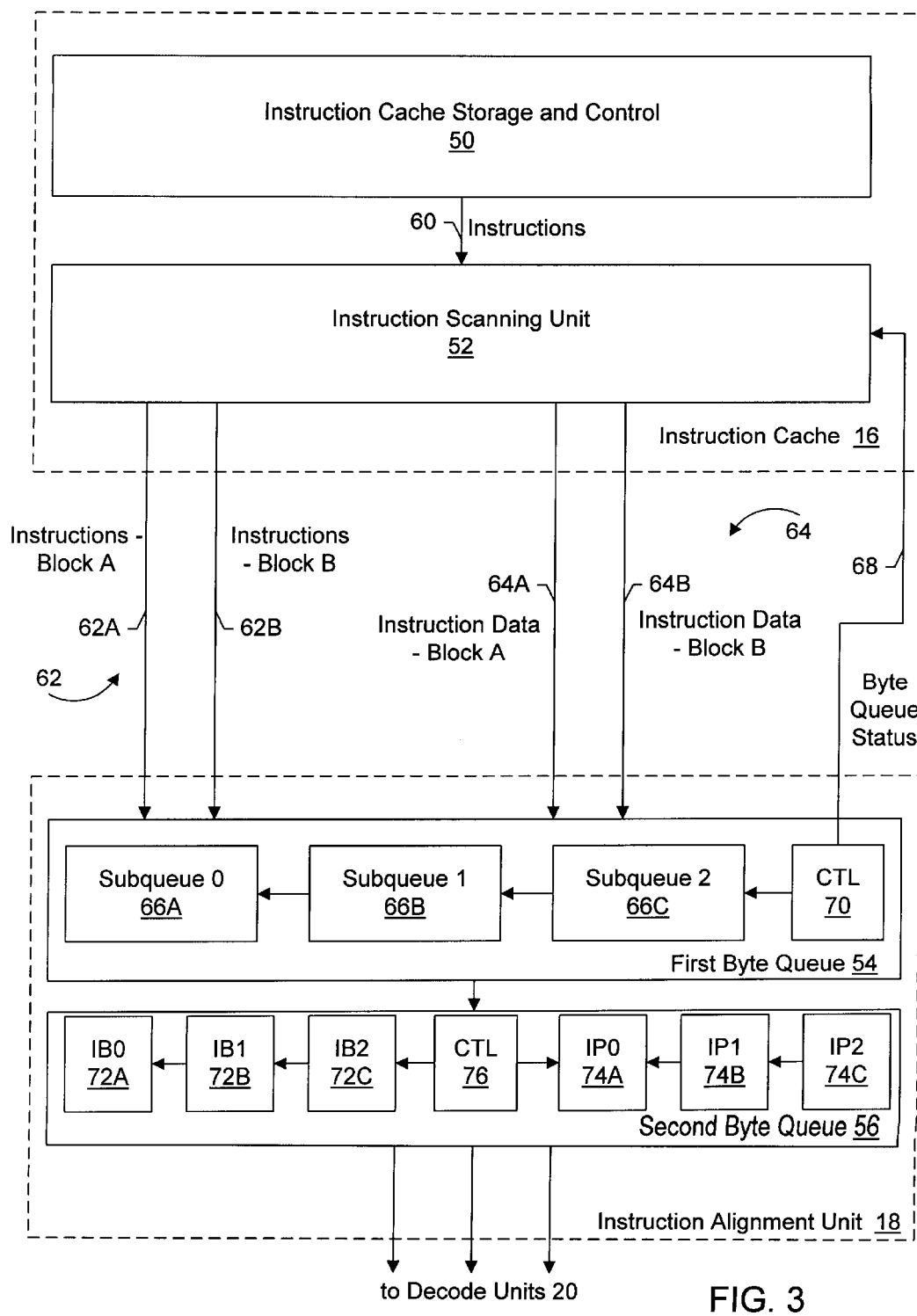
FIG. 3 is a block diagram of one embodiment of an instruction cache and an instruction alignment unit shown in FIG. 1.

Turning now to FIG. 3, a block diagram of one embodiment of instruction cache 16 and instruction alignment unit 18 is shown. Instruction cache 16 includes an instruction cache storage and control block 50 and an instruction scanning unit 52. Instruction alignment unit 18 includes a first byte queue 54 and a second byte queue 56.

Instruction cache storage and control block 50 includes storage for instruction cache lines and related control circuitry for fetching instructions from the storage, for selecting cache lines to discard when a cache miss is detected, etc. Instruction cache storage and control block 50 receives fetch addresses from branch prediction unit 14 (shown in FIG. 1) in order to fetch instructions for execution by microprocessor 10. Instruction bytes fetched from instruction cache storage and control block 50 are conveyed to instruction scanning unit 52 upon an instructions bus 60. Instruction bytes are conveyed upon instructions bus 60, as well as corresponding predecode data (e.g. start, end, and functional bits). In one embodiment, sixteen bytes stored in contiguous memory locations are conveyed upon instructions bus 60 along with the corresponding predecode data. The sixteen bytes form either the upper or lower half of the 32 byte cache line employed by instruction cache 16 according to the present embodiment. The upper half of the cache line is the half stored in memory addresses having larger numerical values, while the lower half is stored in memory addresses having smaller numerical values. Additionally, instruction scanning unit 52 receives information regarding the bytes within the sixteen bytes which are to be conveyed as instructions to instruction alignment unit 18. Instruction bytes at the beginning of the sixteen bytes may be ignored if the bytes are fetched as the target of a branch instruction, and the target address identifies a byte other than the first byte of the sixteen bytes. Additionally, if a branch instruction is within the sixteen bytes and branch prediction unit 14 predicts the branch taken, then bytes subsequent to the branch instruction within the sixteen bytes are ignored.

Instruction scanning unit 52 scans the predecode data associated with the bytes which are to be conveyed as instructions to instruction alignment unit 18. Instruction scanning unit 52 divides the sixteen bytes conveyed by instruction cache storage and control block 50 into two portions comprising eight contiguous bytes each. One portion forms the lower half of the sixteen bytes (i.e. the bytes stored at smaller numerical addresses than the bytes forming the upper half of the sixteen bytes). The other portion forms the upper half of the sixteen bytes. Therefore, an eight byte portion forms one of four quarters of the 32 byte cache line employed by instruction cache storage and control block 50, according to the present embodiment. As used herein, bytes are contiguous if they are stored in contiguous memory locations in the main memory subsystem. It is noted that particular sizes of various components are used herein for clarity of the description. Any size may be used for each component within the spirit and scope of the appended claims.

Instruction scanning unit 52 scans the predecode data of each portion of the instruction bytes independently and in parallel. These portions scanned by scanning unit 52 comprise the fixed number of bytes defined to be an instruction block. Instruction scanning unit 52 therefore scans the predecode data to identify up to the maximum number of instructions per block.

The instruction bytes and instruction identification information generated by instruction scanning unit 52 are conveyed to first byte queue 54 upon an instructions bus 62 and an instruction data bus 64, respectively. As shown in FIG. 3, instructions bus 62 includes an instructions-block A bus 62A and an instructions-block B bus 62B. Instructions-block A bus 62A conveys the instruction bytes corresponding to the first instruction block being scanned by instruction scanning unit 52 (in program order). Similarly, instructions-block B bus 62B conveys the instruction bytes corresponding to the second instruction block being scanned by instruction scanning unit 52.

Instruction identification information corresponding to the instruction bytes conveyed upon instructions-block A bus 62A is conveyed upon instruction data—block A bus 64A. Similarly, instruction identification information corresponding to the instruction bytes conveyed upon instructions-block B bus 62B is conveyed upon instruction data-block B bus 64B. Instruction data-block A bus 64A and instruction data-block B bus 64B comprise instruction data bus 64 as shown in FIG. 3. Each eight byte portion and the corresponding instruction identification information forms an instruction block.

First byte queue 54 receives the instruction blocks conveyed and stores them into one of multiple subqueues included therein. In the embodiment shown, first byte queue 54 includes three subqueues: a first subqueue 66A, a second subqueue 66B, and a third subqueue 66C. First subqueue 66A stores the instruction block which is foremost among the instruction blocks stored in first byte queue 54 in program order. Second subqueue 66B stores the instruction block which is second in program order, and third subqueue stores the instruction block which is third in program order.

If a particular eight byte portion as scanned by instruction scanning unit 52 includes more than the maximum number of instructions per block, then the particular eight byte portion is retained by instruction scanning unit 52. During the following clock cycle, the particular eight byte portion is scanned again. The predecode data corresponding to the previously identified instructions included within the previously dispatched instruction block is invalidated such that instruction scanning unit 52 detects the additional instructions. If the other eight byte portion concurrently received with the particular eight byte portion is subsequent to the particular eight byte portion in program order, then the other eight byte portion is rescanned as well. First byte queue 54 discards the instruction block received from the other eight byte portion, in order to retain program order among the instruction blocks stored in the byte queue.

A control unit 70 within first byte queue 54 conveys a byte queue status upon byte queue status bus 68 to instruction scanning unit 52. Byte queue status bus 68 includes a signal corresponding to each subqueue 66. The signal is asserted if the subqueue 66 is storing an instruction block, and deasserted if the subqueue 66 is not storing an instruction block. In this manner, instruction scanning unit 52 may determine how many instruction blocks are accepted by first byte queue 54 during a clock cycle. If two instruction blocks are conveyed during a clock cycle and only one instruction block is accepted, instruction scanning unit 52 retains the rejected instruction block and rescans the instruction block in the subsequent clock cycle.

As noted above, an instruction block may contain up to a maximum number of instructions (e.g. three in the present embodiment). Additionally, eight contiguous bytes are conveyed for each instruction block. However, due to the variable byte length of the x86 instructions, an instruction may begin within one set of eight contiguous bytes and end in another set of eight contiguous bytes. Such an instruction is referred to as an overflow instruction. If an overflow instruction is detected, it is identified as the last of the maximum number of instructions. Instead of being indicated as a valid instruction within the instruction block, the overflow instruction is identified as an overflow. Instruction identification information is generated, but the instruction is handled somewhat differently, as will be explained in more detail below.

In one embodiment, the instruction identification information for each instruction includes: (i) start and end pointers identifying the bytes at which the identified instruction begins and ends within the instruction block; (ii) a valid mask including a bit for each of the bytes within the instruction block; (iii) a bit indicative of whether the instruction is MROM or fast path; (iv) an instruction valid bit indicating that the instruction is valid; and (v) an overflow bit for the last instruction indicating whether or not it is an overflow. The valid mask includes a binary one bit corresponding to each byte included within the particular instruction (i.e. the bits between the start pointer and end pointer, inclusive, are set). Zero bits are included for the other bytes.

Additional information conveyed with the instruction identification information includes the taken/not taken prediction if the instruction is a branch instruction, bits indicating which of the quarters of the 32 byte cache line the eight bytes correspond to, the functional bits from the predecode data corresponding to the eight bytes, and a segment limit identifying the segment limit within the eight bytes for exception handling. The additional information is provided by instruction cache storage and control block 50 except for the branch prediction, which is provided by branch prediction unit 14.

Control unit 70 examines the instruction identification information stored in the subqueues 66 to select instructions from first byte queue 54. Control unit 70 selects a number of instructions for conveyance to second byte queue 56 depending upon the number of instructions currently stored in the second byte queue, and the number of instruction blocks containing those instructions. Generally, control unit 70 selects as many instructions as possible for conveyance to second byte queue 56 based upon the available storage within second byte queue 56 for instruction blocks and instructions. In other words, control unit 70 selects a number of instructions which either fill instruction position storages 74 or the corresponding instruction blocks which are not already stored in instruction bytes storages 72 fill instruction bytes storages 72.

Second byte queue 56 includes a plurality of instruction bytes storages 72A–72C, a plurality of instruction position storages 74A–74C, and a control unit 76. Each instruction bytes storage 72 is configured to store the instruction bytes comprising an instruction block. Therefore, in the embodiment shown, second byte queue 56 may concurrently store instructions which are drawn from up to three different instruction blocks. Each instruction position storage is configured to store an instruction identifier corresponding to one instruction. Generally speaking, an "instruction identifier" is information which locates a particular instruction within instruction bytes storages 72A–72C. The information can be used to select the instruction bytes which comprise the instruction from instruction bytes storage 72A–72C. Therefore, in the embodiment shown, second byte queue 56 may concurrently store instruction identifiers for up to three instructions within the instruction bytes stored in instruction bytes storages 72.

Control unit 76 is configured to select instructions from second byte queue 56 for conveyance to decode units 20. The instruction represented within each instruction position storage 74 is dispatched to a corresponding decode unit 20, subject to a selection criteria employed by control unit 76. Generally, the instruction represented within instruction position storage 74A may be dispatched to decode unit 20A during a clock cycle (assuming no pipeline stalls from decode units 20 or subsequent pipeline stages). If control unit 76 determines that the instruction represented within instruction position storage 74B may be concurrently dispatched with the instruction represented within instruction position storage 74A, then the instruction may be dispatched to decode unit 20B. Similarly, if control unit 76 determines that the instruction represented within instruction position storage 74C may be concurrently dispatched with the instructions represented within instruction position storages 74A–74B, then the instruction may be dispatched to decode unit 20C. Upon dispatching one or more instructions, control unit 76 causes the information within instruction position storages 74A–74C to be shifted into adjacent instruction position storages 74A–74B, thereby allowing for additional instructions to be conveyed from first byte queue 54 into second byte queue 56 while maintaining the identified instructions in program order.

According to one embodiment, the selection criteria employed by control unit 76 is as follows:

(i) instructions are dispatched in program order;

(ii) up to three fast path instructions can be concurrently dispatched;

(iii) an MROM instruction can be dispatched if a synchronization signal from MROM unit 34 is asserted indicating that NROM unit 34 is ready to dispatch an MROM instruction;

(iv) an MROM instruction being dispatched to decode unit 20A may concurrently be dispatched with a fast path instruction to decode position 20B and vice-versa (referred to as "packing"—see further discussion below);

(v) at most one MROM instruction is dispatched concurrently;

(vi) an MROM instruction is not dispatched to decode unit 20C (a corollary to criterion (iv));

(vii) at most one predicted taken branch is concurrently dispatched; and (viii) instructions from at most two cache lines are concurrently dispatched (each cache line is represented by an address in reorder buffer 32, and reorder buffer 32 employs two locations for storing addresses for each set of concurrently dispatched instructions in the present embodiment).

As mentioned above, an MROM instruction and a fast path instruction can be "packed" together (i.e. concurrently dispatched). Some MROM instructions are parsed into two fast path instructions, thereby leaving a decode unit 20 available for the concurrent dispatch of a fast path instruction. If MROM unit 34 indicates that the MROM instruction to be dispatched is a two instruction MROM instruction, then control unit 76 selects both the MROM instruction and the adjacent fast path instruction for dispatch. Otherwise, the MROM instruction is dispatched during a different clock cycle than the adjacent fast path instruction. If no fast path instruction is adjacent to the MROM instruction, the MROM instruction is dispatched separate from other instructions regardless of whether or not the MROM instruction parses into two instructions or more than two instructions.

By using first byte queue 54 and second byte queue 56, the location of variable byte length instructions within the instruction blocks is separated from the dispatch of instructions to decode units 20A. These two operations are logically separate from each other and are generally serial in nature. Therefore, first byte queue 54 performs instruction location. Instruction identifiers locating the instructions are placed into instruction position storages 74. By first locating a small number of instructions which are eligible for dispatch and conveying these instructions to second byte queue 56, first byte queue 54 provides a smaller pool of instructions to which second byte queue 56 may apply the dispatch selection criteria. Since a relatively small number of instructions are examined, the selection criteria may be applied using a relatively small number of cascaded levels of logic. A high frequency implementation of instruction alignment may thereby be realized.

While the small pool of instructions stored by second byte queue 56 allows a high frequency implementation, the larger pool of instructions maintained by first byte queue 54 allows for more instructions to be fetched from instruction cache 16 during a given clock cycle than if second byte queue 56 were employed alone. Thus, first byte queue 54 may increase the average number of instructions dispatched during a given clock cycle by rapidly providing instructions into second byte queue 56 when instructions are dispatched. Advantageously, instruction alignment unit 18 may provide both a high bandwidth (i.e. instructions dispatched per clock cycle) and high frequency alignment of instructions to decode units 20.

It is noted that it may be advantageous to physically locate control units 70 and 76 near each other to facilitate high speed communications therebetween. In addition, it may be advantageous to duplicate control logic between control units 70 and 76 to lessen the communication signals employed between the control units.

It is noted that MROM instructions are identified by instruction scanning unit 52 as well. Instruction scanning unit 52 routes the MROM instructions to MROM unit 34. However, the MROM instructions may flow through instruction alignment unit 18 as well. In this manner, instruction alignment unit 18 may detect the MROM instruction and convey it to decode units 20. MROM unit 34 may then insert the corresponding instructions between early decode units 40 and opcode decode units 44 when the MOM instruction arrives in early decode units 40, as described above with respect to FIG. 2.

Control unit 70, upon detecting that all instructions within a given instruction block have been conveyed to second byte queue 56, shifts the contents of each subqueue 66B–66C into an adjacent subqueue 66A–66B. In this manner, the instruction block which has been exhausted of instructions is discarded and other instruction blocks are maintained in program order. Additionally, the instruction identification information within a subqueue 66 is shifted such that the first field within the subqueue 66 stores the first instruction (in program order) remaining within the subqueue. However, overflow instructions remain in the last field within the subqueue. Control unit 70 further allocates subqueues 66 for storing instruction blocks provided by instruction scanning unit 52.

Figure 4:
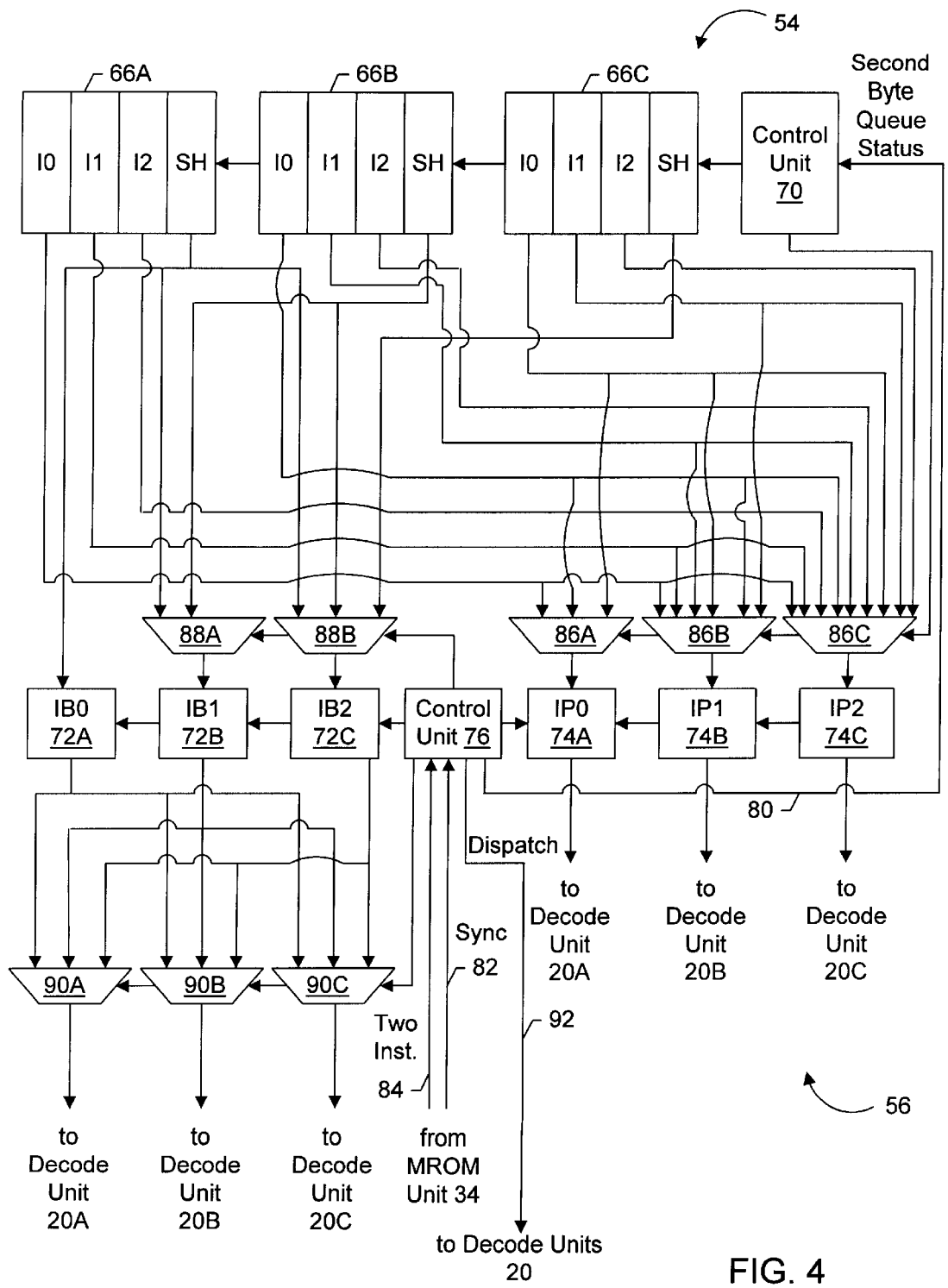
FIG. 4 is a more detailed block diagram illustrating one embodiment of the instruction alignment unit shown in FIG. 3.

Turning next to FIG. 4, a more detailed block diagram of one embodiment of first byte queue 54 and second byte queue 56 is shown. Each of subqueues 66 from first byte queue 54 are illustrated as having various fields, including a first instruction field (I0), a second instruction field (I1), and third instruction field (I2), and a shared field (SH). Each of the first instruction field, the second instruction field, and the third instruction field are configured to store instruction identification information corresponding to one instruction within the instruction block stored in that subqueue. The information stored in the instruction fields and the shared fields according to one embodiment of the subqueues is shown below. A second byte queue status bus 80 is coupled between control unit 76 and control unit 70. Additionally, control unit 76 is coupled to a sync line 82 and a two instructions line 84 from MROM unit 34. A plurality of instruction multiplexors 86A–86C are coupled between subqueues 66A–66C and instruction position storages 74A–74C. A plurality of instruction bytes multiplexors 88A–88B are coupled between subqueues 66A–66C and instruction bytes storages 72B–72C. Additionally, a plurality of output multiplexors 90A–90C are coupled between instruction bytes storages 72A–72C and decode units 20.

Control unit 70 is coupled to provide multiplexor selection controls to instruction multiplexors 86. Control unit 70 generates the multiplexor selection controls by scanning the instruction valid bits corresponding to the instruction fields within subqueues 66 and the information conveyed upon second byte queue status bus 80. Second byte queue status bus 80 indicates which of instruction position storages 74 and which of instruction bytes storages 72 are empty upon dispatching instructions during a particular clock cycle. For example, second byte queue status bus 80 may comprise a signal corresponding to each instruction position storage 74A–74C indicative, when asserted, that the corresponding instruction position storage 74 is storing an instruction subsequent to dispatch of instructions during the current clock cycle. Additionally, second byte queue status bus 80 may be include a signal corresponding to each instruction byte storage 72A–72C indicative, when asserted, that the corresponding instruction bytes storage 72 is storing a block of instruction bytes subsequent to instruction dispatch during the current clock cycle.

Control unit 70 selects as many instructions as possible from subqueues 66 to fill instruction position storages 74. Control unit 70 also considers availability of instruction bytes storages 72 in selecting instructions. Generally, control unit 70 selects a number of instructions for instruction position storages 74 which either fills instruction position storages 74 or fills instruction bytes storages 72. Control unit 70 considers the validity of instructions within subqueues 66A–66C in selecting instructions for instruction position storages 74. Advantageously, the type of instruction (MROM or fast path) and other instruction properties stored in subqueues 66A–66C (such as whether or not an instruction is a predicted taken branch instruction, etc.) need not be considered by control unit 70 in selecting instructions to fill instruction position storages 74. The logic for performing the selection may be simplified, thereby allowing for a high frequency implementation.

As shown in FIG. 4, instruction multiplexor 86A is coupled to receive instruction information from the 10 instruction field of each subqueue 66A–66C. Since instruction position storage 74A stores the instruction which is first in program order, among instructions in instruction position storages 74A–74C, and since subqueues 66A are shifted such that the first instruction in program order is the instruction in field I0, instruction multiplexor 86A is connected to select from only the first instruction field of each subqueue 66A–66C. Similarly, instruction multiplexor 86B is coupled to select instruction information from either instruction fields I0 and I1. Instruction multiplexor 86B is coupled to select instruction information from any field within subqueues 66.

Instruction bytes storages 72 are coupled to receive blocks of instructions from subqueues 66 via instruction bytes multiplexors 88. Control unit 76 is coupled to provide selection controls for multiplexors 88 as shown in FIG. 4, but control unit 70 may provide selection controls as well. Instruction bytes storage 72 are maintained such that instruction bytes storage 72A stores a block of instruction bytes corresponding to instructions which are prior to instructions corresponding to blocks of instruction bytes in instruction bytes storages 72B and 72C. Similarly, instruction bytes storage 72B stores a block of instruction bytes corresponding to instructions which are prior to instructions corresponding to the block of instruction bytes in instruction bytes storage 72C. Therefore, if instruction bytes storage 72A receives a block of instruction bytes from subqueues 66, the block of instruction bytes is drawn from subqueue 66A. Blocks of instruction bytes in subqueues 66B and 66C are subsequent to the block of instruction bytes in subqueue 66A. Additionally, instruction bytes storage 72A may receive a block of instruction bytes shifted in from instruction bytes storage 72B. Similarly, instruction bytes storage 72A may receive a block of instruction bytes from subqueue 66A or subqueue 66B, while instruction bytes storage 72C may receive a block of instruction bytes from any subqueue 66.

For example, if instruction bytes storages 72A–72C are empty during a clock cycle, instruction bytes storage 72A may receive a block of instruction bytes from subqueue 66A; instruction bytes storage 72B may receive a block of instruction bytes from subqueues 66B; and instruction bytes storage 72C may receive a block of instruction bytes from subqueue 66C. On the other hand, if instruction bytes storage 72A is storing a block of instruction bytes during a clock cycle, instruction bytes storage 72B may receive a block of instruction bytes from subqueue 66A and instruction bytes storage 72C may receive a block of instruction bytes from subqueue 66B. Generally, a block of instruction bytes may be selected for storage into instruction bytes storages 72 via instruction bytes multiplexors 88, and a particular block of instruction bytes may be validated if an instruction within the particular block of instruction bytes is conveyed into instruction position storages 74.

Instruction identifiers stored in instruction position storages 74A–74C are directly conveyed to corresponding decode units 20A–20C. Control unit 76 signals which instructions have been selected for dispatch via a dispatch bus 92 coupled to decode units 20. If a decode unit 20A–20C receives an indication that the corresponding instruction is being dispatched, the decode unit 20 operates upon the received instruction information and corresponding instruction bytes selected via multiplexors 90. It is noted that, in the case of overflow instructions, instruction bytes from more than one of instruction bytes storages 72 may be selected by a given output multiplexor 90A–90C.

Control unit 76 receives synchronization signals from MROM unit 34 in order to dispatch MROM instructions. The sync signal upon sync line 82 indicates, when asserted, that MROM unit 34 is prepared to dispatch an MROM instruction. Control unit 76 does not select an MROM instruction for dispatch unless the sync signal is asserted. Control unit 76 asserts a similar sync signal to MROM unit 34 to indicate that the MROM instruction has been selected. Additionally, a two instruction line 84 carries an indication, when asserted, that the next MROM instruction to be dispatched translates into two fast path instructions. Control unit 76 uses the two instruction indication to determine if a fast path instruction can be concurrently dispatched with the MROM instruction.

It is noted that, although multiplexors 86, 88, and 90 as shown in FIG. 4 are individual multiplexors, the selection represented by each multiplexor may actually be performed by multiple multiplexors, arranged in cascade or in parallel.

Turning now to FIG. 5, a diagram is shown depicting exemplary information stored in a field 110 of subqueues 66A–66C, according to one embodiment. For example, field 110 may be field I0, I1, or I2 for the first, second, or third instruction within an instruction block. Each field stores equivalent information regarding different instructions. Field 110 stores a valid indication 112, a start pointer 114, an end pointer 116, a valid mask 118, an MROM/fast path indication 120, and a branch prediction indication 122.

Valid indication 112 identifies the validity or invalidity of the remainder of the information stored in field 110. If the valid indication indicates validity, then instruction identification information is stored in field 110. If the valid indication indicates invalidity, then instruction identification information is not stored within field 110 (i.e. field 110 is empty). In one embodiment, valid indication 112 comprises a bit indicative, when set, that instruction identification information is stored within field 110. When clear, the bit indicates that instruction identification information is not stored within field 110.

Start pointer 114 and end pointer 116 locate the byte positions within the instruction block at which the instruction identified in field 110 begins and ends, respectively. For embodiments in which an instruction block includes 8 bytes, start pointer 114 and end pointer 116 each comprise three bit values indicating the numerical position between zero and seven of the respective start or end point. Valid mask 118 is a mask of zeros and ones. Each bit in the mask corresponds to one of the bytes within the instruction block. Bits in the mask corresponding to bytes not included within the instruction identified by field 110 are set to zero. Conversely, bits in the mask corresponding to bytes included within the instruction are set to one. For example, if the instruction identified by field 110 begins at the third byte within the instruction block and ends at the fifth byte within the instruction block, the start pointer is 010, the end pointer is 100, and the mask is 00111000 (all expressed in binary format). The start pointer, end pointer, and mask are used to generate selection controls for selecting bytes within the instruction block when the instruction is selected for issue.

MROM/fast path indication 120 indicates the MROM or fast path nature of the instruction identified by field 110. In one embodiment, indication 120 comprises a bit indicative, when set, that the instruction is an MROM instruction. When clear, the bit indicates that the instruction is a fast past instruction. Finally, branch prediction indication 122 comprises a bit indicative, when set, that the instruction is a branch instruction which is predicted taken. When clear, the bit indicates that the instruction is either not a branch instruction or is a branch instruction predicted not taken.

Turning now to FIG. 6, a diagram is shown depicting exemplary information stored in a shared field 130 of a subqueue 66A–66C. Information stored in shared field 130 is shared information valid for the entire instruction block, according to one embodiment. An address bits field 132, a functional bits field 134, a segment limit field 136, an overflow indication 138, and an instruction bytes field 140 are included. Address bits field 132 stores a pair of address bits which identify the quarter of the cache line from which the instruction block was fetched. Functional bits field 134 stores the original functional bits from the predecode data associated with the instruction bytes within the instruction block.

Segment limit field 136 is used to detect instructions being dispatched from outside the code segment. As will be appreciated by those skilled in the art, the x86 microprocessor architecture divides the memory space into segments. One of these segments is the code segment, from which instructions are fetched. The segment has a defined limit, which may be of arbitrary size. If instruction execution proceeds outside of the code segment, a segment limit violation exception is signalled. Microprocessor 10 may handle segment limit violations as follows: if an entire set of instructions fetched from instruction cache 16 during a clock cycle lies outside the code segment, the instructions are not conveyed to instruction alignment unit 18. Instead, the segment limit violation is signalled to reorder buffer 32 and to the control logic within instruction cache 16. The control logic generates a signal to MROM unit 34, causing MROM unit 34 to begin dispatching the exception service routine corresponding to the segment limit violation. If instructions prior to the segment limit violation retire successfully (as opposed to being discarded due to branch misprediction or other exception), then the exception may be taken at that time. However, the limit may be arbitrary and therefore may fall within the set of instructions fetched from instruction cache 16. Segment limit field 136 is included for handling this case. If the limit is crossed within the instruction block, then segment limit field 136 indicates which byte position represents the segment limit. In one embodiment, segment limit field 136 comprises four bits to indicate a limit at one of the sixteen bytes within the instruction cache line. If an instruction beyond the limit imposed by segment limit field 136 is dispatched, an exception is signalled to reorder buffer 32.

Overflow indication 138 indicates that one of the instructions within the instruction block overflows into the subsequent instruction block. Information regarding the overflowing instruction is stored in field I2 of the corresponding subqueue 66A–66C. In one embodiment, overflow indication 138 comprises a bit indicative, when set, that an instruction within the instruction block overflows. When clear, the bit indicates that no instruction within the instruction block overflows. If overflow indication 138 is set, then the valid indication within field I2 is clear. Alternatively, overflow indication 138 is clear if the valid indication within field I2 is set. In this manner, field I2 is indicated either to store an overflow instruction or a valid instruction ending within the instruction block, but not both. Additionally, field I2 is indicated to be not storing an instruction if both overflow indication 138 and the valid indication for position I2 are clear. Instruction bytes field 140 stores the actual instruction bytes included within the instruction block. In one embodiment, instruction bytes field 140 is eight bytes wide.

Figure 7:
FIG. 7 is a diagram illustrating instruction identification information stored in an instruction position within a second byte queue according to one embodiment of the instruction alignment unit.

Turning next to FIG. 7, an exemplary instruction identifier 150 stored by one embodiment of instruction position storages 74 is shown. Other embodiments may employ different instruction identifiers than the embodiment shown in FIG. 7. As shown in FIG. 7, instruction identifier 150 includes valid indication 112, start pointer 114, end pointer 116, valid mask 118, MROM/fast path indication 120, and branch prediction 122 from the instruction field of the subqueue 66A–66C which stored the instruction when the instruction was conveyed into the instruction position storage 74.

Additionally, instruction identifier 150 includes a start block field 152 and an end block field 154. Start block field 152 identifies which of instruction bytes storages 72 stores the start byte of the instruction. Similarly, end block field 154 identifies which of instruction bytes storages 72 stores the end byte of the instruction. For non-overflow instructions, start block field 152 and end block field 154 store the same value. Using start block field 152, end block field 154, start pointer 114, and end pointer 116, control unit 76 may form select controls for output multiplexors 90.

Figure 8:
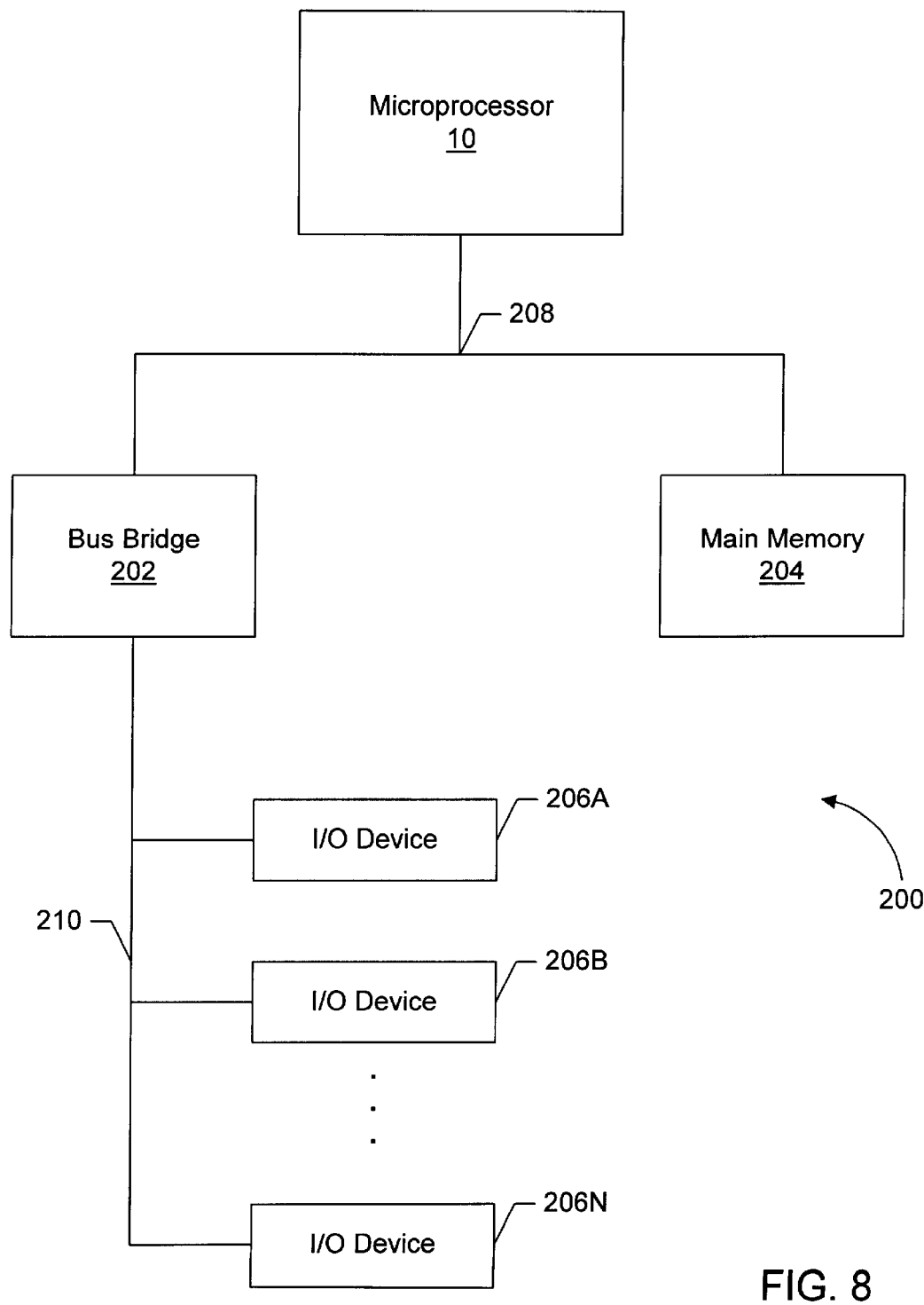
FIG. 8 is a block diagram of one embodiment of a computer system including the microprocessor shown in FIG. 1.

Turning now to FIG. 8, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 8 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |

TABLE 1-continued x86 Fast Path, Double Dispatch, and MROM Instructions

| X86 Instruction | Instruction Category |
|---|---|
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |

TABLE 1-continued x86 Fast Path, Double Dispatch, and MROM Instructions

| X86 Instruction | Instruction Category |
| --- | --- |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   an instruction cache for storing a plurality of variable byte-length instructions;
   a predecode unit coupled to said instruction cache and configured to generate at least one predecode tag associated with at least one byte of an instruction, wherein said at least one predecode tag includes a start bit having a value indicative of whether said at least one byte is a starting byte of said instruction, an end bit having a value indicative of whether said at least one byte is an ending byte of said instruction, and a functional bit that conveys a meaning dependent upon said value of said start bit, wherein a state of said functional bit of a second byte of each of said plurality of variable byte-length instructions and a state of said end bit of a first byte of each of said plurality of variable byte-length instructions is indicative of whether or not said first byte of each of said variable byte-length instructions is a prefix byte;
   a plurality of decode units for decoding designated instructions which correspond to said plurality of variable byte-length instructions; and
   an instruction alignment unit coupled between said instruction cache and said plurality of decode units for providing decodable instructions to said plurality of decode units.

2. The microprocessor as recited in claim 1 wherein said instruction alignment unit is configured to provide said instruction to one of said plurality of decode units.

3. The microprocessor as recited in claim 1 wherein each of said plurality of said decode units is configured to decode a predetermined subset of an instruction set including said plurality of variable byte-length instructions.

4. The microprocessor as recited in claim 1 wherein at least one decode unit is configured to identify prefix bytes as a function of the functional and end bits.

5. The microprocessor as recited in claim 1 wherein the at least one decode unit includes a circuit which logically ANDs an inverted end bit associated with one byte of the instruction with the functional bit of another byte of the instruction.

6. The microprocessor of claim 1 further comprising a microcode unit, wherein the microcode unit is configured to translate second instructions into first instructions, wherein the decode units are configured to decode first instructions.

7. The microprocessor as recited in claim 6 wherein at least one decode unit is configured to identify prefix bytes as a function of the functional and end bits.

8. The microprocessor as recited in claim 1 wherein said instruction alignment unit is configured to provide said predecode tag to at least one of said plurality of decode units.

9. The microprocessor as recited in claim 8 wherein at least one of the decode units is configured to detect said predecode tag to determine a boundary of said instruction.

10. The microprocessor as recited in claim 1 further comprising a plurality of functional units configured to receive output signals from said plurality of decode units.

11. A microprocessor comprising:
    an instruction cache for storing a plurality of instruction bytes; and
    a predecode unit coupled to said instruction cache, wherein said predecode unit is configured to predecode said plurality of instruction bytes prior to their storage within said instruction cache, wherein said predecode unit is configured to generate a functional bit and an end bit for each of said plurality of instruction bytes, wherein a state of said functional bit of a second byte of said plurality of instruction bytes and a state of said end bit of a first byte of said plurality of instruction bytes is indicative of whether or not said first byte of said plurality of instruction bytes is a prefix byte.

12. The microprocessor as recited in claim 11, wherein said predecode unit is further configured to generate a plurality of predecode bits for each of said plurality of instruction bytes, wherein said plurality of predecode bits includes said functional bit, a start bit, and said end bit.

13. The microprocessor as recited in claim 11, wherein said instruction cache is further configured to store said predecode bits.

14. The microprocessor as recited in claim 11 further comprising:
    a plurality of decode units coupled to receive decodable instructions corresponding to variable byte length instructions, wherein said variable byte length instructions are formed form said plurality of instruction bytes, wherein said plurality of decode units are configured to decode said decodable instructions.

15. The microprocessor as recited in claim 14, wherein said plurality of decode units logically AND said functional bit associated with said second byte of said plurality of instruction bytes with a logical inverse of said end bit of said first byte of said plurality of instruction bytes to identify whether or not said first byte of said plurality of instruction bytes is said prefix byte.

16. The microprocessor as recited in claim 15, wherein if the result of said logical ANDing operation is a logical one, then said first byte of said plurality of instruction bytes is said prefix byte, wherein if the result of said logical ANDing operation is a logical zero, then said first byte of said plurality of instruction bytes is not said prefix byte.

17. The microprocessor as recited in claim 16 further comprises:
    an instruction alignment unit coupled to said plurality of decode units, wherein said instruction alignment unit is further coupled to said instruction cache, wherein said instruction alignment unit is configured to provide said decodable instructions from said instruction cache to said plurality of decode units.

18. The microprocessor as recited in claim 17, wherein said plurality of decode units is configured to determine a location of said prefix byte and an opcode byte without having to first determine whether said variable byte length instruction is a fast path instruction or a microcode instruction.

19. The microprocessor as recited in claim 18 further comprises:

a microcode unit coupled to said instruction cache, wherein said microcode unit is configured to implement selected variably byte length instructions in microcode, wherein said plurality of decode units are configured to not decode in microcode.

20. A microprocessor comprising:

an instruction cache for storing a plurality of instruction bytes; and a predecode unit coupled to said instruction cache, wherein said predecode unit is configured to predecode said plurality of instruction bytes prior to their storage within said instruction cache, wherein said predecode unit is further configured to generate a functional bit for each of said plurality of instruction bytes, wherein a state of said functional bit of a second byte of said plurality of instruction bytes is indicative of whether or not a first byte of said plurality of instruction bytes is a prefix byte.

21. The microprocessor as recited in claim 20, wherein said state of said functional bit of said second byte of said plurality of instruction bytes and a state of an end bit of said first byte of said plurality of instruction bytes is indicative of whether or not said first byte of said plurality of instruction bytes is said prefix byte.

22. The micro processor as recited in claim 21, wherein said predecode unit is configured to generate a plurality of predecode bits for each of said plurality of instruction bytes, wherein said plurality of predecode bits includes said functional bit, a start bit, and said end bit.

23. The microprocessor as recited in claim 20, wherein said instruction cache is further configured to store said predecode bits.

24. The microprocessor as recited in claim 20 further comprising:

a plurality of decode units coupled to receive decodable instructions corresponding to variable byte length instructions, wherein said variable byte length instructions are formed form said plurality of instruction bytes, wherein said plurality of decode units are configured to decode said decodable instructions.

25. The microprocessor as recited in claim 24, wherein said plurality of decode units logically AND said functional bit associated with said second byte of said plurality of instruction bytes with a logical inverse of an end bit of said first byte of said plurality of instruction bytes to identify whether or not said first byte of said plurality of instruction bytes is said prefix byte.

26. The microprocessor as recited in claim 25, wherein if the result of said logical ANDing operation is a logical one, then said first byte of said plurality of instruction bytes is said prefix byte, wherein if the result of said logical ANDing operation is a logical zero, then said first byte of said plurality of instruction bytes is not said prefix byte.

27. The microprocessor as recited in claim 26 further comprises:

an instruction alignment unit coupled to said plurality of decode units, wherein said instruction alignment unit is further coupled to said instruction cache, wherein said instruction alignment unit is configured to provide said decodable instructions from said instruction cache to said plurality of decode units.

28. The microprocessor as recited in claim 27, wherein said plurality of decode units is configured to determine a location of said prefix byte without having to first determine whether said variable byte length instruction is said fast path instruction or said microcode instruction.

29. The microprocessor as recited in claim 28 further comprises:

a microcode unit coupled to said instruction cache, wherein said microcode unit is configured to implement selected variable byte length instructions in microcode, wherein said plurality of decode units are configured to not decode in microcode.

30. A method for predecoding variable byte length instructions in a microprocessor comprising:

receiving a plurality of instruction bytes forming variable byte length instructions;

generating a functional bit corresponding to each of said plurality of instruction bytes, wherein a state of said functional bit of a second byte of said plurality of instruction bytes is indicative of whether or not a first byte of said plurality of instruction bytes is a prefix byte.

31. The method for predecoding variable byte length instructions as recited in claim 30 further comprising:

generating an end bit corresponding to each of said plurality of instruction bytes, wherein said state of said functional bit of said second byte of said plurality of instruction bytes and a state of said end bit of said first byte of said plurality of instruction bytes is indicative of whether or not said first byte of said plurality of instruction bytes is said prefix byte.

32. The method for predecoding variable byte length instructions as recited in claim 31 further comprising:

generating a plurality of predecode bits for each of said plurality of instruction bytes, wherein said plurality of predecode bits includes said functional bit, a start bit, and said end bit.

33. The method for predecoding variable byte length instructions as a recited in claim 32, wherein said start bit is set if a corresponding one of said plurality of instruction bytes is a first byte of one of said variable byte length instructions, wherein said end bit is set if a corresponding one of said plurality of instruction bytes is a last byte of one of said variable byte length instructions.

34. The method for predecoding variable byte length instructions as recited in claim 33 further comprising:

determining the exact location of said prefix byte and an opcode byte without having to first determine whether said variable byte length instruction is a fast path instruction or a microcode instruction.

35. A computer system comprising:

a microprocessor comprising:

an instruction cache for storing a plurality of instruction bytes;

a predecode unit coupled to said instruction cache, wherein said predecode unit is configured to predecode said plurality of instruction bytes prior to their storage within said instruction cache, wherein said predecode unit is further configured to generate a functional bit for each of said plurality of instruction bytes, wherein a state of said functional bit of a second byte of said plurality of instruction bytes is indicative of whether or not a first byte of said plurality of instruction bytes is a prefix byte; and an input/output device configured to communicate between said computer system and another computer system to which said input/output device is capable of being coupled.

36. The computer system as recited in claim 35, wherein said input/output device is a modem.

37. The computer system as recited in claim 35, wherein said input/output device is a peripheral device.

38. The computer system as recited in claim 35 further comprising:

an audio input/output device.

* * * * *

UNITED STATES PATENT AND TRADEMARK OFFICE
CERTIFICATE OF CORRECTION

PATENT NO. : 6,175,908 B1
DATED : January 16, 2001
INVENTOR(S) : James K. Pickett It is certified that error appears in the above-identified patent and that said Letters Patent is hereby corrected as shown below:

Claim 22, col. 27, line 25, please delete "micro processor" and insert --microprocessor-- in place thereof.

Claim 33, col. 28, line 31, after "instructions as" please delete "a".

Signed and Sealed this

Fifteenth Day of May, 2001

*Attest:*

NICHOLAS P. GODICI

*Attesting Officer*       *Acting Director of the United States Patent and Trademark Office*